(12) United States Patent
Meixner et al.

(10) Patent No.: US 7,792,224 B2
(45) Date of Patent: Sep. 7, 2010

(54) INTERFERENCE DETECTION IN A WIRELESS COMMUNICATION SYSTEM

(75) Inventors: Michael Meixner, Erlangen (DE);
Mathias Pauli, Neufahrn (DE); Mats Hogberg, Partille (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1158 days.

(21) Appl. No.: 10/544,812

(22) PCT Filed: Feb. 11, 2003

(86) PCT No.: PCT/EP03/01301

§ 371 (c)(1),
(2), (4) Date: Apr. 25, 2006

(87) PCT Pub. No.: WO2004/073189

PCT Pub. Date: Aug. 26, 2004

(65) Prior Publication Data

US 2006/0209999 A1    Sep. 21, 2006

(51) Int. Cl.
*H03D 1/04* (2006.01)
(52) U.S. Cl. .................. 375/346; 375/345; 375/316; 375/326; 375/344; 455/296; 455/226.1; 455/295
(58) Field of Classification Search ............... 375/346, 375/345, 316, 326, 344; 455/296, 295, 67.11, 455/226.2, 226.1
See application file for complete search history.

(56) References Cited

U.S. PATENT DOCUMENTS

| 3,889,249 | A  | * | 6/1975  | Bennett et al.    | 340/551   |
|-----------|----|---|---------|-------------------|-----------|
| 6,525,837 | B1 | * | 2/2003  | Adkins et al.     | 358/1.5   |
| 6,813,350 | B2 | * | 11/2004 | Ching             | 379/386   |
| 6,993,291 | B2 | * | 1/2006  | Parssinen et al.  | 455/67.11 |
| 7,181,184 | B1 | * | 2/2007  | Dimeo et al.      | 455/296   |
| 7,194,050 | B2 | * | 3/2007  | Nicholls et al.   | 375/346   |

OTHER PUBLICATIONS

European Patent Office, International Search Report for PCT/EP03/01301.

* cited by examiner

*Primary Examiner*—Eva Y Puente

(57) ABSTRACT

A receiver and a method are applied in a wireless communication system for detecting interference with a coexisting radar system. A signal received from an antenna is fed through an analog part and a subsequent digital part of said receiver. The receiver has an element with a-priori known attenuation values for a predefined set of frequencies, a first branch-off element for deriving a first detection signal from the signal before the element and a second branch-off element for deriving a second detection signal from the signal after the element. The receiver processes the first and the second detection signal such that a difference between the first and second detection signal is comparable with a threshold value, where the threshold value depends on the a-priori known attenuation values of the element. Depending on the comparison result, a frequency is identified as interfering or not a co-existing radar system.

13 Claims, 5 Drawing Sheets

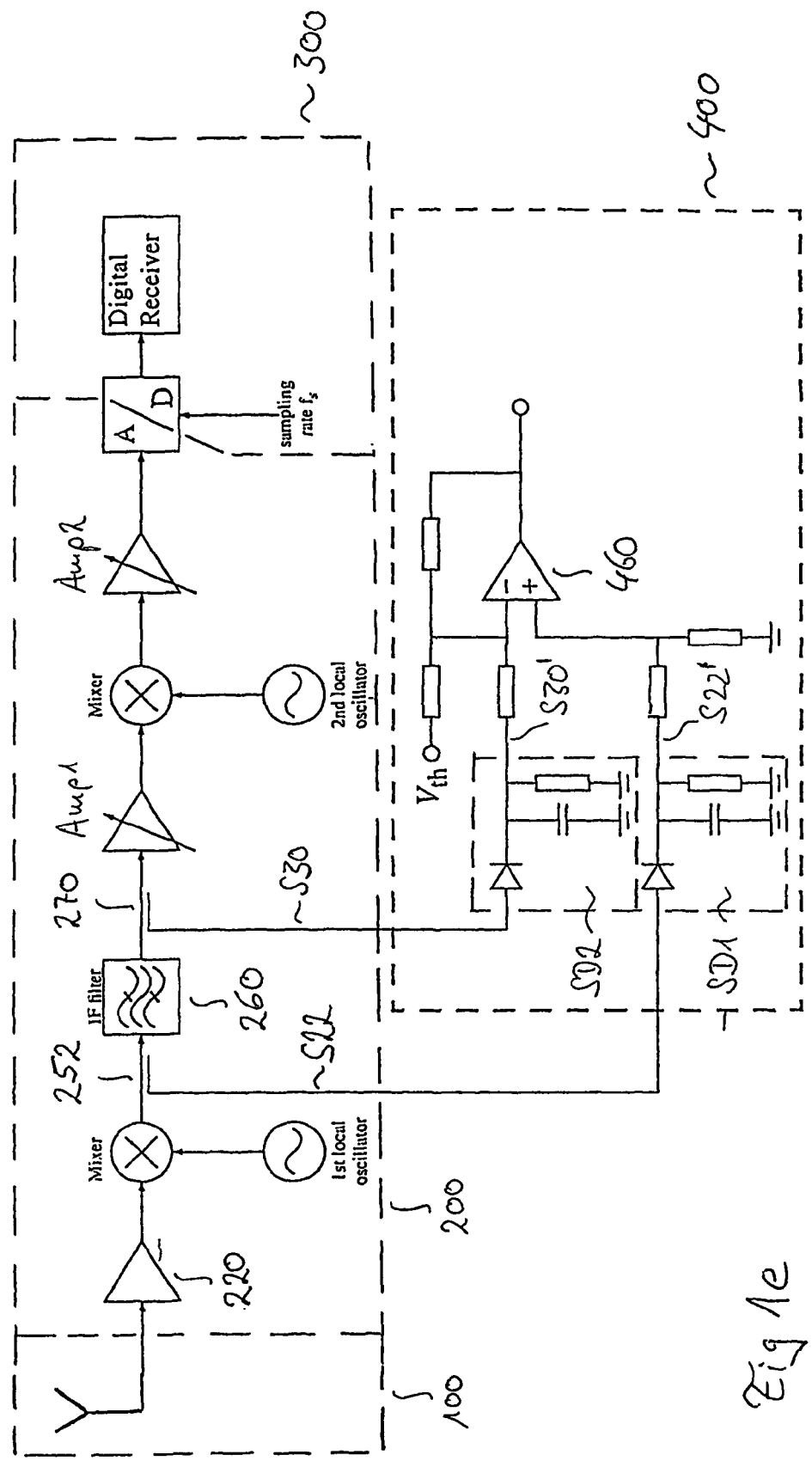

INTERFERENCE DETECTION IN A WIRELESS COMMUNICATION SYSTEM

The invention relates to interference detection in a wireless communication system. In particular, the present invention relates to a receiver and a method in a wireless communication system for detecting interference with a co-existing radar system.

BACKGROUND

Certain wireless communication systems, such as for example wireless local area networks (WLAN) or universal mobile telecommunication systems (UMTS) are discussed to operate in frequency bands, which are also used by radar systems. This co-existence of a wireless communication system with a radar system leads to the fact that the frequency bands from both systems overlap at least partly. For example WLAN systems, like HIPERLAN/2 or IEEE802.11a, are planned to operate in the frequency range from 5150 MHz to 5350 MHz and 5470 MHz to 5725 MHz, while radar systems are using the frequency range from 5250 MHz to 5850 MHz.

Currently, when a wireless communication system in the 5 GHz range is planned to co-exist with a radar system, it is a regulation that the radar system is the primary user. Hence, it is mandatory to avoid that the wireless communication system interferes with the radar system. Therefore, to avoid a possible conflict with the radar system, the wireless communication system has to vacate the frequencies, currently in use by the radar system.

A typical radar system transmits signals in pulses with a pulse length from around 0.05 to 100 μs and a transmission power in the range up to 60 dBW. With this knowledge, a receiver in the wireless communication system is able to distinguish the radar signals from other signals transmitted in the wireless communication system. If e.g. for an observed frequency, the signal strength from a received signal is in such a time period from around 0.05 to 100 μs above a certain value, it is assumed that this frequency is actually used by a radar system. Then, the wireless communication system has to remove this frequency from the list of allowed transmission frequencies or has to change the currently used frequency to avoid any harmful interference to the radar system.

If, in a receiver, e.g. the signal strength is measured after an analog-to-digital converter stage in the digital part, the indication which frequency is currently used from a radar system is ambiguous. This measured signal strength can be above a threshold either due to a received radar signal, which is transmitted on the currently observed frequency or from a radar signal, which is transmitted on some other frequencies, but converted to the observed frequency. Such other frequencies can be converted to the currently observed frequency for example by means of image frequency conversion or aliasing effects. The image frequency conversion results from the arrangement of the analog part in the receiver as a heterodyne receiver with a limited image rejection. The aliasing effects results from the analog-to-digital-converter stage in the receiver, which converts the received signal at a limited sampling rate. Hence, if the detection is arranged in the digital part of the receiver, more frequencies are wrongly determined as possibly in use by a co-channel radar system. Then, more frequencies are determined as to be vacated as really needed and thus the number of usable frequencies for transmission in the wireless communication system is limited more than required.

SUMMARY

It is therefore the object of the present invention to overcome the above mentioned problem and provide a receiver for detecting interference in a wireless communication system, where a signal received from an antenna is fed on a signal path in an analog part to a subsequent digital part, comprising a first branch-off element for deriving from the signal on the signal path a first detection signal, a second branch-off element for deriving from the signal on the signal path a second detection signal, an element arranged in the signal path between said first and said second branch-off element, wherein the element having a-priori known attenuation values for a set of predefined frequencies, and processing means for processing the first and the second detection signal such that a difference between the first and the second detection signal is comparable with a threshold value, wherein the threshold value depends on the a-priori known attenuation values of the element.

Further a method for detecting interference in a wireless communication system is provided, wherein the wireless communication system having transmitter and receiver for transmitting and receiving signals from a list of allowed transmission frequencies, and wherein the wireless communication system co-exists with a radar system, and the method comprising the steps of receiving the signals with an antenna of the above provided receiver, identifying a frequency as interfering the co-existing radar system, if the difference between two of the first, second and third detection signal is below the threshold value, and avoiding said frequency for further transmission within said wireless communication system.

For the detection of a possible conflict with a coexisting radar system, the receiver of the wireless communication system detects if the received signal strength is above a certain threshold for a certain time interval. Then, according to the present invention, those frequencies are selected, which really interfere the co-existing radar system. Therefore the element, which is between a first and a second branch-off element, is used. The element has a-priori known attenuation values for a set of predefined frequencies. The attenuation is lower for signals on frequencies from that set of predefined frequencies and the attenuation is higher for signals on frequencies other than the predefined set of frequencies. This causes, that the difference between the signal before and after that element and thus the difference between the first detection signal and the second detection signal will become lower for frequencies from the set of predefined frequencies, whereas the difference will become higher for the other frequencies. The difference is compared with the threshold value and if the difference is below a threshold value, it is assumed that the co-existing radar system really uses frequencies from the set of predefined frequencies. If the difference between the second and first detection signal is above a threshold value, it is assumed that the radar system actually uses another frequency than the predefined frequencies. Hence it is distinguishable if a measured high signal strength results from a co-channel radar system, which is using a frequency from the set of predefined frequencies or from a radar system, which is using other frequencies but converted to that set of predefined frequencies. With it, the detection of a possible conflict with a co-existing radar system is more precise and the wireless communication system then has only to avoid those frequencies from the set of predefined frequencies for further transmission, which really interfere with a radar system.

Further features and advantages of the present invention will be apparent to those skilled in the art from the dependent claims and the following detailed description, taken together with the accompanying figures, where

BRIEF DESCRIPTION OF DRAWINGS

FIGS. 1a-e show embodiments of the present invention.

DETAILED DESCRIPTION

Figure 1A:
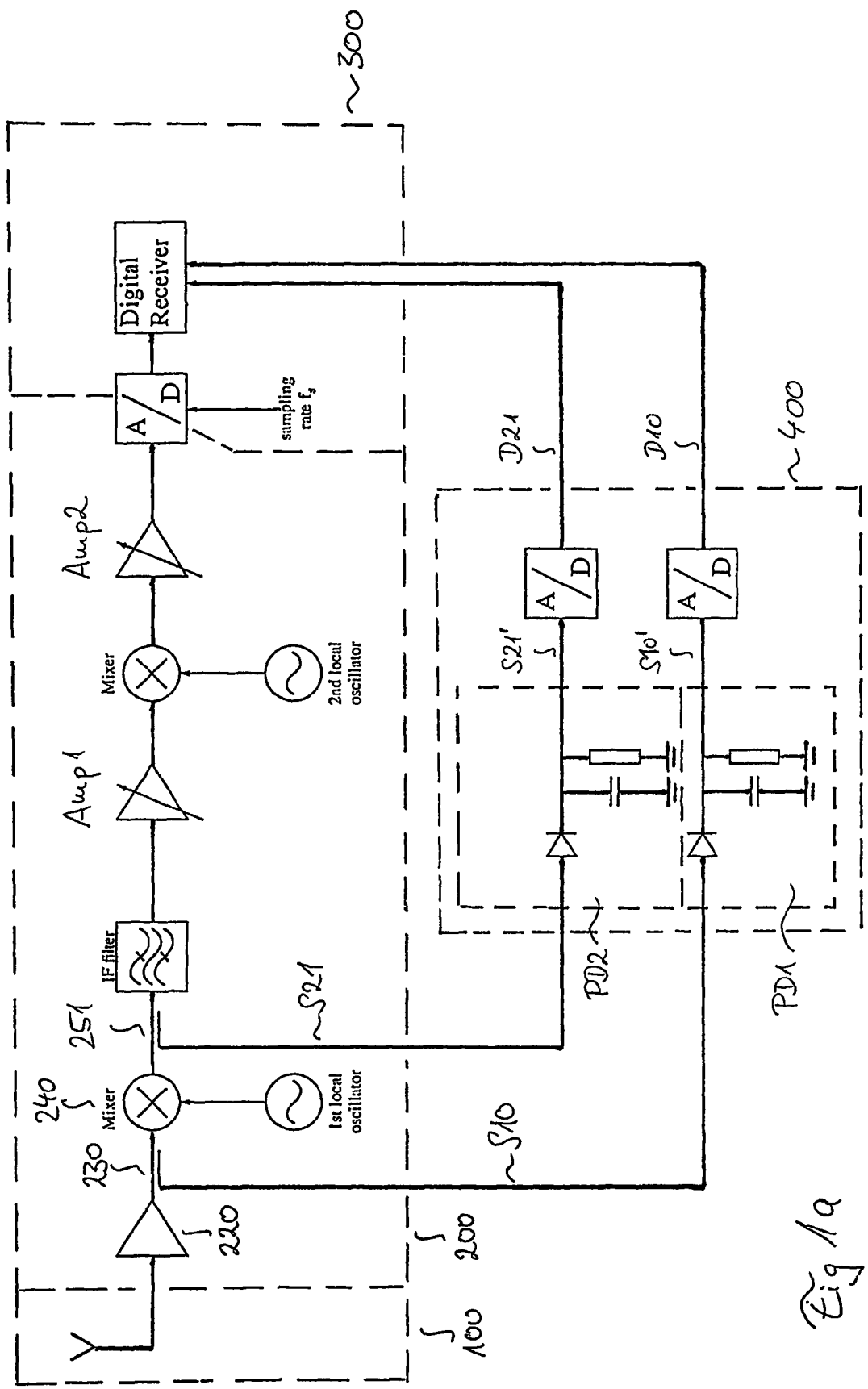

The principle structure of the receiver is similar in all shown embodiments 1a-e, except some additional elements, which are in accordance to the present invention. Such a principle receiver structure, known to those skilled in the art, can be divided into an antenna 100, an analog part 200 and a digital part 300. Modifications in the structure, respectively in the arrangement of the elements, are possible as long as they have no influence to the principle of the present invention. A signal, which is received from the antenna 100, is fed on a signal path through the analog part 200. In the analog part 200, frequency converters and filters among other elements are arranged in the signal path. An analog-to-digital converter then converts the analog signal from the analog part 200 into a digital signal in the subsequent digital part 300. In the digital part 300, the digital signal is further processed in the digital receiver element. Also, this digital receiver element is here not described in more detail, because the functions of such a digital receiver are well known and are also outside the scope of the present invention. The principle of the present invention, which is common to all embodiments, as shown in the FIGS. 1a-e, is the presence of a first branch-off element 230,252 and a second branch-off element 251,270 and an element 240,260 with a-priori known attenuation values for the set of predefined frequencies and which is arranged between said first and second branch-off element. The element 240,260 has a lower attenuation for a passing signal, when the signal is on a frequency from the set of predefined frequencies. On the other side, the element 240,260 has a significantly higher attenuation, when the input signal is from one of the other frequencies. For a skilled person it is obvious that not only the attenuation values for the set of predefined frequencies are known. Rather, for the element, also the attenuation values for almost all from the other frequencies are known a-priori. Then, depending on the attenuation values, and thus depending on the set of predefined frequencies, a threshold value is defined. From the branch-off elements before and after the element a first and a second detection signal are achievable. Such a branch-off element can be each kind of element, like a directional coupler, which detects the signal strength and generates a detection signal, which is proportional to the signal strength of the measured signal. The difference between the second and first detection signal is compared with said threshold value and the result of the comparison gives an indication whether or not a radar system really uses a frequency from the set of predefined frequencies.

Now, in the following only a few possible embodiments of the receiver according to the present invention will be described in more detail. FIG. 1a shows an embodiment where the first branch-off element 230 is arranged after a low noise amplifier 220 and before a mixer element 240. The mixer element 240 is dedicated as the element with the a-priori known attenuation values for a set of predefined frequencies. The mixer element causes lower attenuation values for the normal frequency space being converted onto the intermediate frequency and a higher attenuation value for the space of image frequencies that are converted onto the same intermediate frequency. Thus the normal frequency space converted to the intermediate frequency defines here the set of predefined frequencies and the space of image frequencies defines the other frequencies. Or in other words, the set of predefined frequencies consists of the carrier frequencies of the receiver and the other frequencies are frequencies that are converted onto the same intermediate frequency by image frequency conversion. After the mixer 240, the second branch-off element 251 is arranged. The first branch-off element 230 extracts a first detection signal S10 from the signal on the signal path and the second branch-off element 251 extracts a second detection signal S21 from the signal on the signal path. The branch-off elements 230/251 are preferably directional couplers as well known from prior art. The first S10 and the second S21 detection signal are fed to the processing means 400. The processing means 400 includes a first PD1 and a second PD2 power-detector element. These power-detector elements must be able to follow a typical radar signal. The output of the first power detector S10' and the output of the second power-detector element S21' are then fed into the processing means 400 to respective analog-digital converters (A/D). The one A/D converter converts the first detection signal S10' into a first digital signal D10. The other A/D converter converts the second detection signal S21' into a second digital signal D21. The digital signals DI0 and D21 are then comparable in the digital part 300 of the receiver with the predefined threshold value. In a preferred solution, the absolute value of the difference between the first digital signal DI0 and the second digital signal D20 is compared with the threshold value according to the equation $D=|DI0-(D20+IL)|$, wherein IL is the insertion loss of the element. If the difference is above the predefined value, it is assumed that a co-existing radar system is using only other frequencies than frequencies from the set of predefined frequencies. Then the wireless communication system has neither to change the currently used frequency nor to exclude this frequency from the list of allowed transmission frequencies.

Figure 1B:
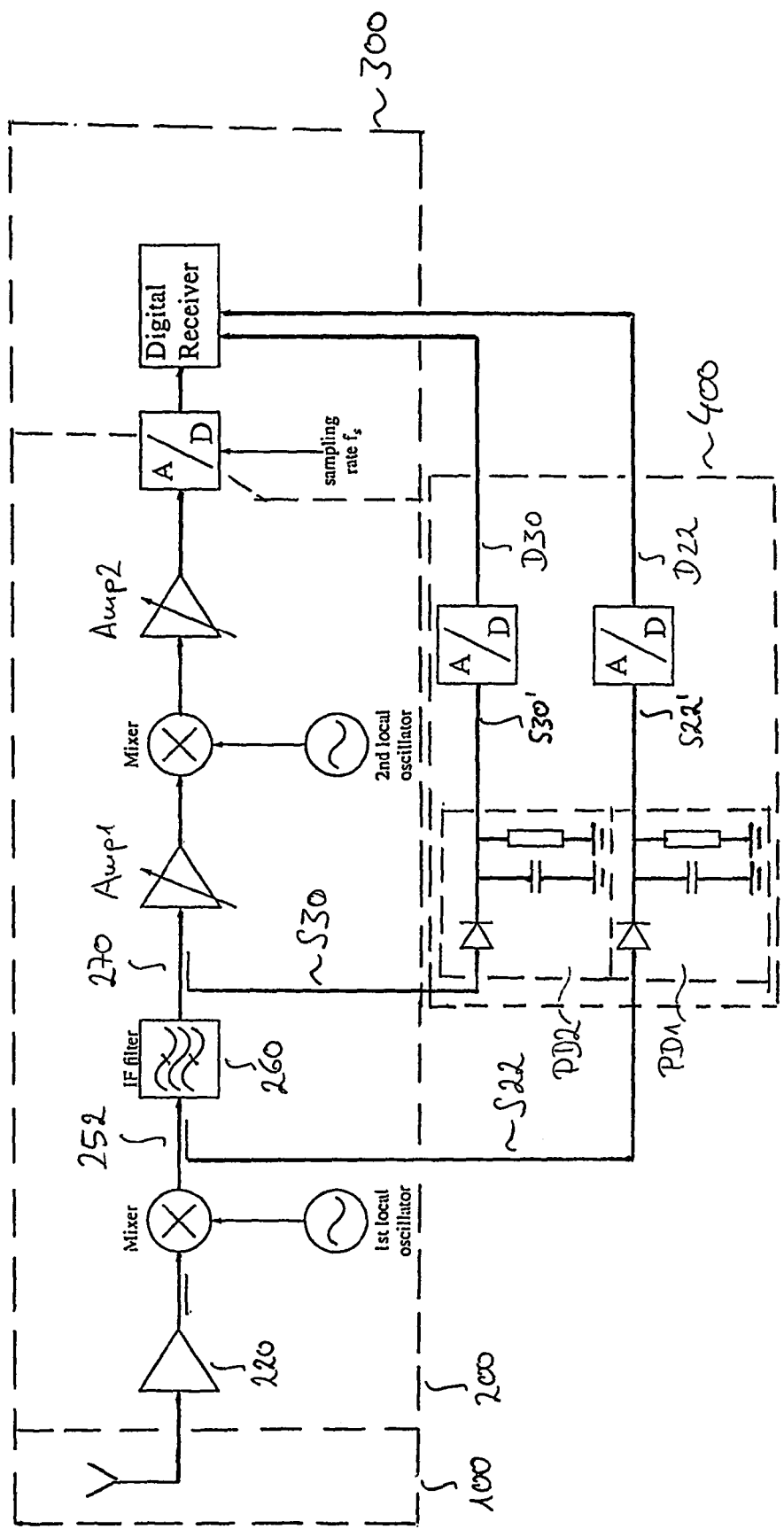
Figure 1C:
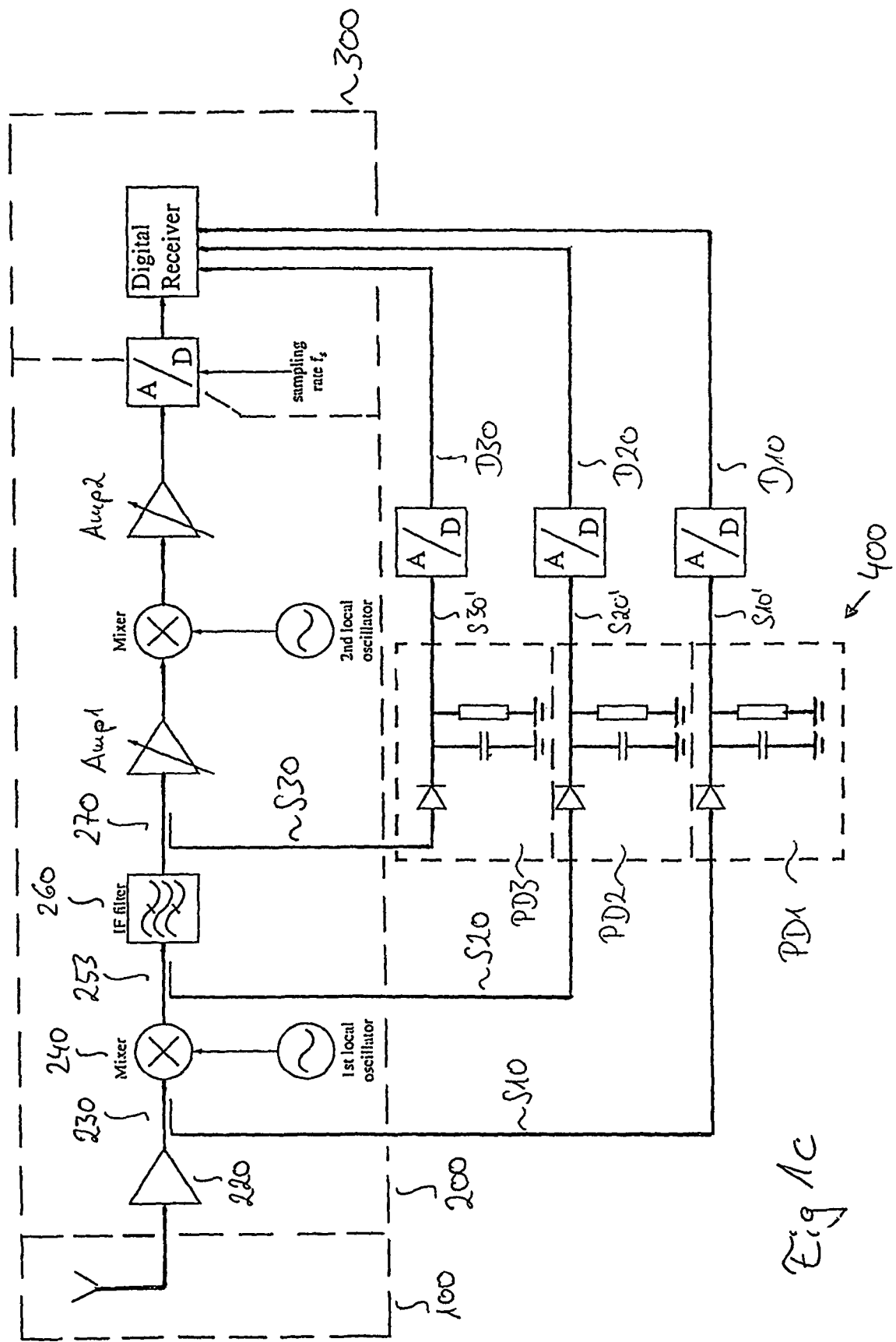
Figure 1D:
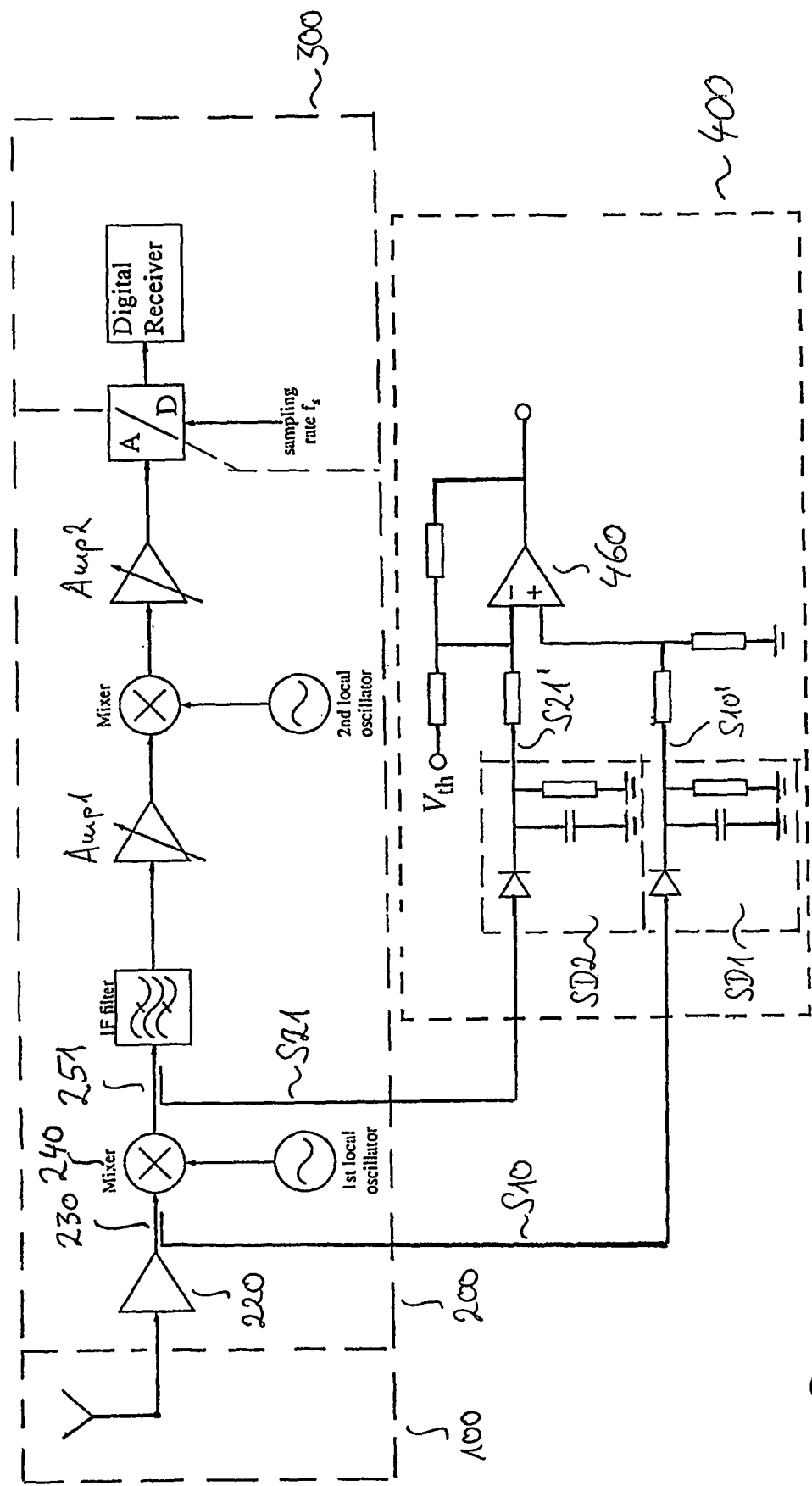

FIG. 1d shows an embodiment, which only differs from that one in FIG. 1a with respect to the elements after the power detector elements in the processing means 400. Here, alternatively to the analog digital converters from FIG. 1a the output of the power detectors 8D1 and 8D2 are fed to an adder. Such an analog adder 460, also well known from prior art, can comprise several resistors and an operational amplifier. In the analog adder, the difference of the detection signals S21', S10' is compared with an analog threshold value. As already described before, depending on whether the difference is below or above the threshold, the wireless communication system is able to decide if there is a possible conflict with a co-existing radar system.

FIG. 1b shows another embodiment of the present invention. In principle, the arrangement is the same as in the above described FIGS. 1a and 1d. The difference in the arrangement is that here the IF-filter 260 is dedicated as the element with a-priori known attenuation values for the set of predefined frequencies. The IF-filter is a band-pass-filter element, which has a low attenuation on frequencies within a dedicated frequency band and much higher attenuation on the other frequencies from outside that frequency band. Here, the frequencies from the band-pass filter 260 define the set of predefined frequencies. The first branch-off element 252 is arranged before that IF-filter 260 and the second branch-off element 270 is arranged after that IF-filter 260. The first detection signal S22 and the second detection signal S30 are fed into the processing means 400. The processing means 400 comprises the already described power detectors PD1 and PD2 and A/D converters, which process the detection signals S22 and S30 as described before.

FIG. 1e is the same arrangement as in FIG. 1b, with the only exception that the output S22' and S30' of the power-detectors are fed to an analog adder 460.

FIG. 1c shows an improved embodiment of the present invention. The receiver comprises a first branch-off element 230 in the signal path between a low noise amplifier 220 and the subsequent mixer 240. A second branch-off element 253 is in the signal path between the mixer 240 and a subsequent IF filter 260. A further branch-off element 270 is in the signal path behind the IF filter 260. The extracted first S10, second 820 and third S30 detection signals are fed into the processing means 400. The detection signals are input into respective power-detector elements PD1, PD2 and PD3. The output of each of said power-detector elements is then analog digital converted in subsequent A/D converter. Finally the digital signals D10, D20 and D30 are compared with a first and a further threshold value. The advantage of that embodiment is that the number of interferers, which would falsely be interpreted as being co-channel interferers, now can be correctly detected. Thus the detection of interference is much more precise.

In a further, but not shown, alternative embodiment to FIG. 1a, the second digital detection signal D21 can be derived directly from the digital part 300 of the receiver instead of branching off from the analog part 200. Then, it is not longer necessary to have a second branch-off element 251.

For all the described embodiments it is important to have an element, where the attenuation for range of frequencies are known a-priori, and a branch-off element before and after that element. With it, the signal before and after the element can be compared and the comparison result gives then an indication whether or not there is an interference problem. It is obvious to those skilled in the art and thus not further explained, how the difference is done exactly. Rather, there are several known methods to calculate the difference. E.g., as described with respect to the embodiment in FIG. 1a it can be done, when calculating an absolute value from the difference of the measured signal before and after the element. Further in an alternative embodiment also the difference could be calculated, when adding two negative detection signals. It is only important for the present invention to detect a difference between the detection signals. If another than one of the set of predefined frequencies is detected, the wireless communication system needs neither to exclude this frequency from the number of allowed transmission frequencies nor has to change the actual used frequency. On the contrary the wireless communication system has to avoid that said observed frequency is used for further transmission, if it is detected that the observed frequency is from the set of predefined frequencies which means that the difference is below the threshold value.

If a received signal strength above a threshold is measured, but according to the principle of the present invention the further measurements lead to the result that the signal is not on a frequency from the set of predefined frequencies, the wireless communication system can continue the transmission on the set of allowed frequencies. But then it should be taken into account that such a situation leads to a higher DC offset in the receiver, which can decrease the performance. In such a case, additional or adapted existing filter elements in the signal path should be used.

The implementation of the principle of the present invention in a receiver for a wireless communication system leads to a plurality of embodiments and variations. Such a receiver can be a separate controller unit within the wireless communication system or a mobile terminal. In such a case, both, the controller unit or the mobile terminal have to inform a central unit, like a base station or access point, whether or not any kind of interference is detected. Further, the receiver itself can be the receiver part of a transceiver device, like an access point in a WLAN system or a base station in an UMTS system.

The invention claimed is:

1. A receiver for detecting interference in a wireless communication system, wherein a signal received from an antenna is fed on a signal path in an analog part to a subsequent digital part, said receiver comprising:
    a first branch-off element for deriving from the signal on the signal path a first detection signal;
    a second branch-off element for deriving from the signal on the signal path a second detection signal;
    a first attenuation element, arranged in the signal path between said first and said second branch-off element, having known attenuation values for a set of predefined frequencies; and,
    processing means for processing the first and the second detection signals such that a difference between the first and the second detection signals is comparable with a first threshold value, wherein the first threshold value depends on the known attenuation values of the element;
    a further branch-off element, the further branch-off element for deriving from the signal on the signal path a third detection signal;
    a further attenuation element with further known attenuation values for a further set of predefined frequencies, arranged in the signal path between the second and the further branch-off element; and,
    said processing means for processing the first, the second and the third detection-signal such that a difference between the second and the third detection signal is comparable with a second threshold value, wherein the second threshold value depends on the further known attenuation values of the further element.

2. The receiver recited in claim 1, wherein each of the branch-off element is a directional coupler.

3. The receiver recited in claim 1, wherein the processing means comprises first and second power-detector elements, wherein the first detection signal is input into the first power detector element and the second detection signal is input into the second power-detector element.

4. The receiver recited in claim 3, wherein the processing means further comprises an analog-digital converter for converting the output of a power-detector element in a digital signal, wherein the difference between two of the digital signals is comparable with the first threshold value.

5. The receiver recited in claim 1, wherein the processing means converts the output of the comparator into binary information.

6. The receiver recited in claim 1, wherein the receiver comprises an access point of a wireless local area network.

7. The receiver recited in claim 1, wherein the receiver comprises a base station of a universal mobile communication system.

8. The receiver recited in claim 1, wherein the receiver comprises a controller unit which is connectable with an access point of a wireless local area network.

9. The receiver recited in claim 1, wherein the receiver comprises a mobile terminal, the mobile terminal being connectable to an access point of a wireless local area network or with a base station of a universal mobile communication system.

10. The receiver recited in claim 1, further comprising a low noise amplifier arranged in the signal path of the analog part before the first branch-off element.

11. The receiver recited in claim 1, wherein the first attenuation element is an image-rejection-mixer, wherein the set of predefined frequencies consists of the carrier frequencies of the receiver.

12. The receiver recited in claim 1, wherein the further attenuation element is a band-pass-filter, wherein the set of predefined frequencies are the frequencies within the band-pass of the band-pass-filter.

13. The receiver recited in claim 12, wherein the band-pass-filter is an intermediate-frequency-filter or a base-band-filter.

* * * * *

UNITED STATES PATENT AND TRADEMARK OFFICE
CERTIFICATE OF CORRECTION

| | | |
|---|---|---|
| PATENT NO. | : 7,792,224 B2 | Page 1 of 1 |
| APPLICATION NO. | : 10/544812 | |
| DATED | : September 7, 2010 | |
| INVENTOR(S) | : Meixner et al. | |

It is certified that error appears in the above-identified patent and that said Letters Patent is hereby corrected as shown below:

In Column 2, Lines 64-67, delete "Further features and advantages of the present invention will be apparent to those skilled in the art from the dependent claims and the following detailed description, taken together with the accompanying figures, where".

Signed and Sealed this
First Day of February, 2011

David J. Kappos
*Director of the United States Patent and Trademark Office*